Aug. 10, 1965   E. BÄDER ETAL   3,199,491
APPARATUS FOR COATING ONE SURFACE OF A STRIP BY A FLUID
BED SINTERING PROCEDURE
Filed March 20, 1961   2 Sheets-Sheet 1

INVENTOR
Erich Bäder
Günter Uhlig

BY
ATTORNEYS

INVENTOR
Erich Bader
Gunter Uhlig

3,199,491
APPARATUS FOR COATING ONE SURFACE OF A STRIP BY A FLUID BED SINTERING PROCEDURE

Erich Bäder, Hanau am Main, and Günter Uhlig, Grosskrotzenburg am Main, Germany, assignors to Deutsch Gold- und Silber-Scheideanstalt vormals Roessler, Frankfurt am Main, Germany
Filed Mar. 20, 1961, Ser. No. 97,087
Claims priority, application Germany, Mar. 25, 1960, D 32,946
8 Claims. (Cl. 118—68)

The invention relates to apparatus for continuously coating by a modified fluid bed sintering procedure one side of a strip, which may be of metal or of heat-resistant textile structure, such as webs or fleeces of glass of asbestos fibres or the like, with a thermoplastic synthetic resin.

There exists in industry a substantial demand for metal or textile bands coated with synthetic resin.

The primary object of the invention is to provide a practical continuous procedure for coating bands on one side with such materials.

It is known to coat metal objects on the entire surface with synthetic resins by immersing the heated metal object into a swirling mass of resin powder. The thermoplastic resin is thereby sintered on the surface of the metal object and forms a cohesive layer thereon.

It is also known to provide such strips with a resin layer by applying a film of resin to the strip which is held thereon either by an adhesive or by its thermoplastic nature. Also, resin can be spread in paste form on the strip, which is then given a heat treatment to melt or set the resin. Either of these procedures can be carried out continuously. However, they are clumsy and expensive, because in each several treating steps are necessary. The use of a film requires its production in a separate step, while the use of paste necessitates a long setting or hardening time.

An object of the present invention is to provide a continuous system for coating metal or heat-resistant strips in which the above drawbacks are avoided, and which is practical and efficient.

According to the invention, a travelling heated strip, moving at an angle to the horizontal, for instance on a slant, has one face brought in contact with a fluidized sinter bed. This makes certain that the particles of resin strike the strip. The strip is then heated in a heating channel, for example with infra-red rays, or by gas or resistance heating. The strip, which can be any flat, relatively thin, flexible band, may be of many different materials, such as metals, metal alloys, heat-resistant textiles (glass or asbestos fibres) in the form of webs, knitted strips, fleeces or the like.

Metal strips or bands so coated are useful as acid-resisting materials for the manufacture of vats, casings and containers and in chemical and acid apparatus. They can also be used for packaging.

The strip is drawn out of the preheating channel by a pair of drawing rolls and fed to the sinter-coating device. The path is kept as short as possible, to avoid heat losses, and the rolls may be heated. Thermal insulation can also be provided.

The strip should be clean and should have no unfavorable characteristics. It can be precoated with an adhesive so that the sintered resin forms a better bond. In the case of metals, cohesion can be improved by phosphatizing, pickling, chromating or the like.

The width of the strip can vary, the packing and guiding means of the apparatus being adjustable in width.

In the sinter coating portion of its path, the band runs on a slant, that is, at an angle to the horizontal, so that the sinter coating proceeds without difficulty. It would be possible to run the band vertically, but a slanting angle is preferred because the height of the apparatus can be reduced. Any chosen angle can be used. It is especially adavntageous to have the band simultaneously follow a curved path, so that the side of the band which is to be coated forms a part of the inside wall of the sinter coating chamber and closes it tightly against the atmosphere. The curve can be an arc of a circle, concave when viewed from the outside and from the side of the strip.

The band can also be slanted transversely, the side edges then being approximately horizontal. In this case also it can follow a curved path.

Further objects and adavntages of the invention will appear more fully from the following description especially when taken in conjunction with the accompanying drawings, which form a part thereof.

In the drawings:

FIG. 4 shows a modification.

Figure 1:
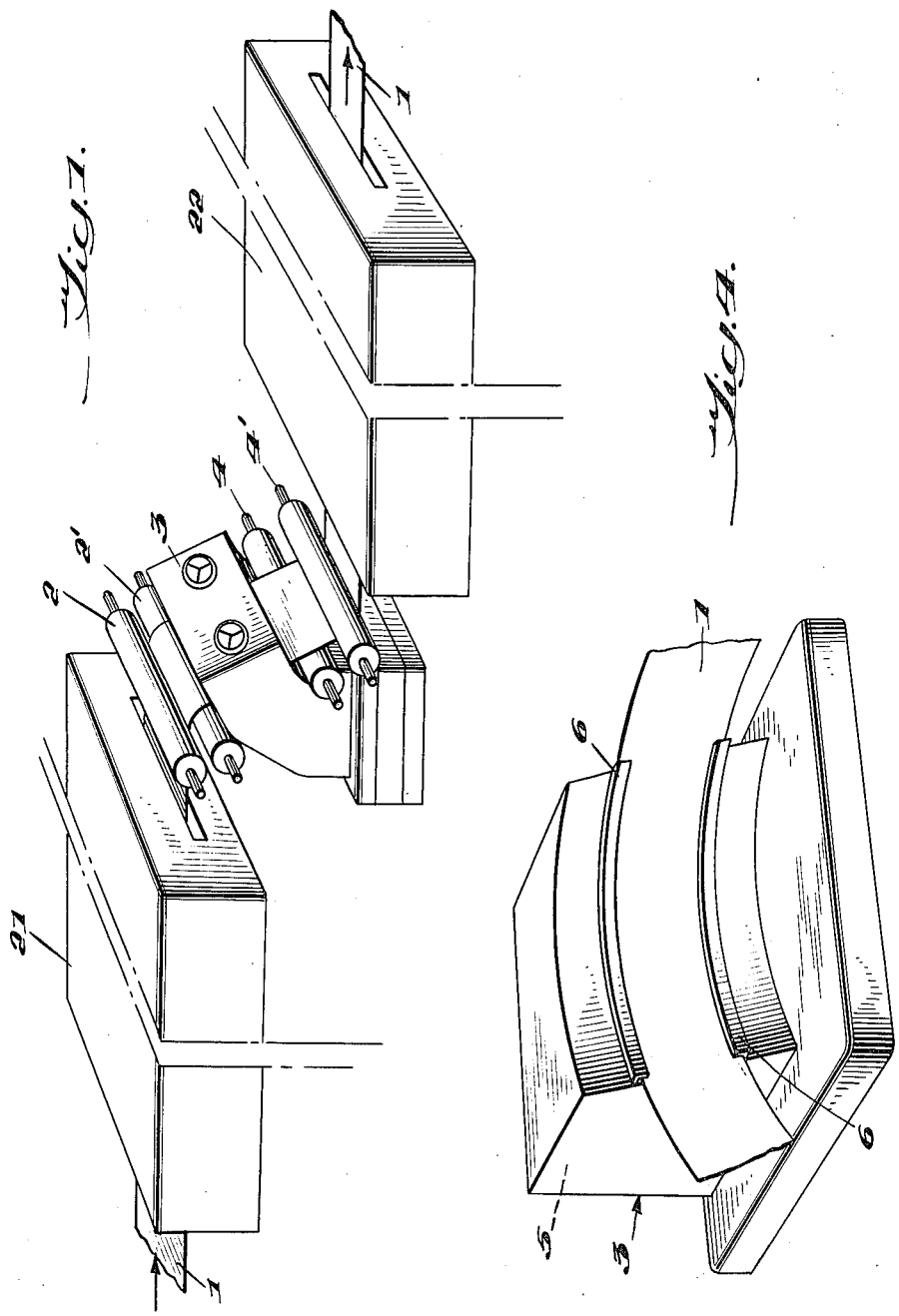
FIG. 1 shows in perspective an apparatus for carrying out the invention.
Figure 2:
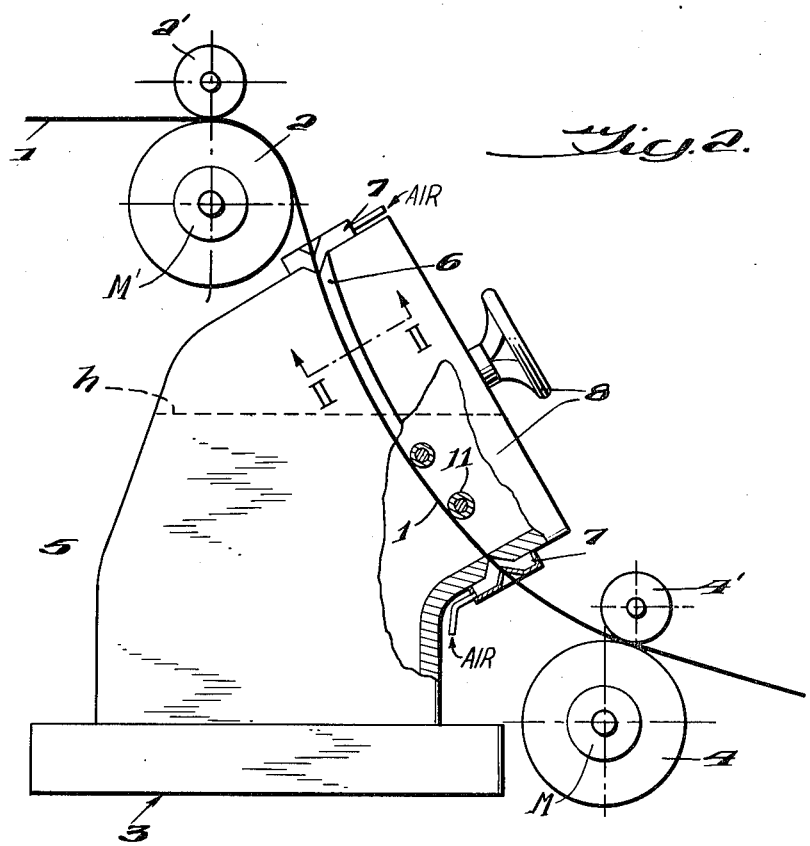
FIG. 2 shows with parts in section a sinter coating device.

In the device of FIG. 1, the strip 1 runs through a heating channel 21, between rolls 2, 2', and is drawn through the sinter coating device 3 by a pair of rolls 4, 4', and then to an after-heating channel 22, wherein the coated strip is further heated. The fluid bed sinter chamber 5, shown in FIG. 2, which can be used in the arrangement of FIG. 1, is filled with resin powder up to the level $h$. The sinter chamber is closed at its upper right side by the band 1, the powder thus coming in contact with the downwardly facing side of the hot band. In this region of contact, a coating of the band with the resin takes place. A packing guide 6 engaged by each edge of the band prevents escape of swirling powder to the outside. These guides 6 can, if desired, be heated or cooled. In connection with an adjustable arrangement 8 with adjusting wheels the guides 6 can be positioned for guiding bands of different thicknesses. Likewise, the band can be readily introduced at the start by moving guides 6 away from the main body of the powder chamber by the hand wheels. The replaceable side frames 9 allow for handling bands of different widths.

At the beginning and end of the path of the band through the sinter coating device 5, measures are taken to prevent escape of resin powder from the chamber. At the entrance, an air or gas blowing device 7 is provided, to which gas under pressure is supplied. This can be a slit formed air nozzle of proper width, by which air, nitrogen or some other gas is blown against the opening into the chamber. The same structure can be used at the outlet.

Figure 3:
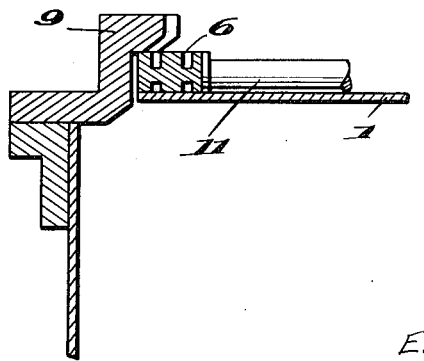
FIG. 3 is a cross-section through a part of the device on the line II—II of FIG. 2.

As shown in FIG. 3, the band is supported and guided in its curved path by rolls 11. The sealing of the side edges of the band with respect to the chamber is achieved by replaceable side frames 9, so that bands of different widths can be treated. The sealing guides 6, which can be heated or cooled if desired, allow the passage of bands of different thicknesses.

After the band has been drawn out of the sinter chamber by rolls 4, 4', it is led through an after heating chamber. The rolls 4, 4' are driven by motor $m$ at a somewhat higher speed than rolls 2, 2' are driven by motor $m'$, so that the band is kept under tension. Additional guiding and supporting rolls at the entrance and exit of the sinter chamber can assure the guiding of the strip. In the after-heater, bands can be so heated as to give the resin layer a smooth surface. The heating elements in the after-heater can be the same as or different from those in the preheater. If a rough surface is desired, after-heating can be omitted. The time of treatment can be varied by changing the throughput speed. Such rough surfaces may be desirable where a frictional surface is necessary.

After the strip 1 leaves the after-heater 22, it can be led through a cooling zone and rolled up or subjected to other treatments.

In the form of FIG. 4, the band is slanted transversely, that is, its edges are substantially horizontal. The path of the band is also curved about a slanting axis where it passes, and forms a part of the wall of the chamber 5. Sealing guides 6 guide the band and seal the edges of the strip.

While we have described herein some embodiments of our invention, we wish it to be understood that we do not intend to limit ourselves thereby except within the scope of the claims hereto or hereinafter appended.

We claim:
1. Apparatus for the continuous coating of one surface of a band of heat-resistant material, comprising means forming a chamber for containing a fluidized bed of resin power, said chamber having an opening therein, a preheater, and means to guide and feed the band through the preheater and thereafter though a path which includes a portion in which the band lies flatwise across such opening and substantially closes the opening so as to form a wall of the container and one surface of the band faces the interior of the chamber for contact with powder fluidized therein, such portion of the path forming a substantial angle with the horizontal, said guiding means in said portion of the path including means carried by said chamber engaging limited portions only of the other surface of the band including the edges thereof, leaving the main portion of such other surface exposed.

2. Apparatus as claimed in claim 1, in which such portion of the path is curved with its concavity towards the interior of the chamber.

3. Apparatus as claimed in claim 1, in which, in said portion of the path, the said one surface is the lower surface of the band.

4. Apparatus as claimed in claim 1, in which such portion of the path is curved.

5. Apparatus as claimed in claim 1, said guiding and feeding means including feed rolls engaging the band on both sides of the chamber, and means to drive the rolls at different speeds to maintain the band under tension in such portion of its path.

6. Apparatus as claimed in claim 5, in which such portion of the path is curved.

7. Apparatus as claimed in claim 1, said guiding and feeding means including sealing strips secured to said chamber and engaging the edges of the band in such portion of its path, said strips extending longitudinally of the path of travel of the band.

8. Apparatus as claimed in claim 1, including gas blowing nozzles adjacent the path at each end of such portion of the path to prevent escape of powder from the chamber.

References Cited by the Examiner

UNITED STATES PATENTS

| | | | |
|---|---|---|---|
| 2,062,795 | 12/36 | Pike | 118—421 |
| 2,729,194 | 1/56 | Jones. | |
| 2,774,327 | 12/56 | Saint-Hilaire | 118—415 X |
| 2,844,489 | 7/58 | Gemmer | 117—21 X |
| 2,938,276 | 5/60 | Doleman et al. | |
| 2,981,631 | 4/61 | Nagel | 117—21 |
| 3,004,861 | 10/61 | Davis | 117—21 X |
| 3,008,826 | 11/61 | Mott et al. | 117—17.5 X |
| 3,108,022 | 10/63 | Church | 117—21 |

WILLIAM D. MARTIN, *Primary Examiner.*

RICHARD D. NEVIUS, *Examiner.*